United States Patent
Han

(10) Patent No.: US 6,714,785 B1
(45) Date of Patent: Mar. 30, 2004

(54) HANDOFF DEVICE AND METHOD FOR MOBILE COMMUNICATION SYSTEM

(75) Inventor: Chung-Seok Han, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/385,934

(22) Filed: Aug. 30, 1999

(30) Foreign Application Priority Data

Aug. 28, 1998 (KR) .............................................. 98-35117

(51) Int. Cl.[7] .................................................. H04Q 7/20
(52) U.S. Cl. .................... 455/440; 455/226.2; 455/441; 455/456.1
(58) Field of Search ............................... 455/422, 436, 455/440, 442, 443, 434, 435–437, 441, 67.11, 63.1, 456.1, 226.2, 226.3

(56) References Cited

U.S. PATENT DOCUMENTS

| | | | | |
|---|---|---|---|---|
| 5,499,386 A | * | 3/1996 | Karlsson | 455/434 |
| 5,577,022 A | * | 11/1996 | Padovani et al. | 455/434 |
| 5,640,677 A | * | 6/1997 | Karlsson | 455/434 |
| 5,657,487 A | * | 8/1997 | Doner | 455/456 |
| 5,754,945 A | * | 5/1998 | Lin et al. | 455/434 |
| 5,818,385 A | * | 10/1998 | Bartholomew | 342/372 |
| 5,999,816 A | * | 12/1999 | Tiedemann, Jr. et al. | 455/437 |
| 6,038,449 A | * | 3/2000 | Corriveau et al. | 455/439 |
| 6,044,271 A | * | 3/2000 | Findikli | 455/436 |
| 6,052,598 A | * | 4/2000 | Rudrapatna et al. | 455/456 |
| 6,119,005 A | * | 9/2000 | Smolik | 455/436 |
| 6,122,512 A | * | 9/2000 | Bodin | 455/440 |
| 6,122,514 A | * | 9/2000 | Spaur et al. | 455/448 |
| 6,128,493 A | * | 10/2000 | Song | 455/436 |
| 6,141,565 A | * | 10/2000 | Fuerstein et al. | 455/422 |
| 6,157,835 A | * | 12/2000 | Findikli et al. | 455/436 |
| 6,246,884 B1 | * | 6/2001 | Karmi et al. | 455/521 |
| 6,324,406 B1 | * | 11/2001 | Zadeh | 455/456 |

* cited by examiner

Primary Examiner—Lee Nguyen
Assistant Examiner—Charles Craver
(74) Attorney, Agent, or Firm—Dilworth & Barrese LLP

(57) ABSTRACT

A device for performing a handoff in a mobile communication system. A mobile station transmits a handoff request message including a measured signal power value and information about a traveling direction thereof, when signal power from an adjacent base station is higher than a threshold. A base station performs a handoff depending on the signal power and the traveling direction, upon receipt of the handoff request message.

22 Claims, 8 Drawing Sheets

HANDOFF DEVICE AND METHOD FOR MOBILE COMMUNICATION SYSTEM

BACKGROUND OF THE INVENTION

1. Field of the Invention

The present invention relates generally to a mobile communication system, and in particular, to a method and apparatus for performing a handoff.

2. Description of the Related Art

In general, for effective management of frequency resources, a mobile communication system divides a radio network into small cell areas, and a mobile station is provided with a service from a base station in a cell to which it belongs. When a mobile station travels from a cell in service to another cell, a handoff is performed for the mobile station to secure a continuous service.

As stated above, a mobile communication system performs a handoff to maintain a call, when a mobile station travels from one cell to another cell. Handoffs are generally divided into soft handoffs and hard handoffs. With regard to the soft handoff, a service is concurrently provided through a channel assigned from an adjacent handoff target base station and a channel assigned by a service base station and then, the channel from the service base station is disconnected when a channel quality of the service base station becomes lower than a predetermined threshold. With regard to the hard handoff, when a channel quality of the service base station becomes lower than a threshold during a call, the channel to the service base station is disconnected and thereafter, a new channel is assigned from an adjacent base station.

FIG. 1 illustrates an overall system structure of a mobile communication system. Referring to FIG. 1, a mobile station (MS) 111 from a plurality of mobile stations belonging to one cell communicate with a corresponding base station (BS). A plurality of base stations 121–12n are controlled by a corresponding base station controller (BSC) 131. A plurality of base station controllers 131–13n are controlled by a mobile station controller (MSC) 141. When a mobile station 111 attempts to call to a wire subscriber 161 in a public switched telephone network (PSTN) 151 through a radio network(BS, BSC, MSC), the mobile switching network 141 establishes a communication channel by connecting the mobile station 111 to the wire subscriber 161 through the PSTN 151.

FIG. 2 illustrates the variation in signal power received from a service base station BS1 and an adjacent base station BS2, when a mobile station travels from a position "a" to a position "b" in a overland area where a service area CELL1 of the service base station BS1 overlaps with a service area CELL2 of the adjacent base station BS2.

A description will now be made regarding a conventional handoff procedure with reference to FIG. 2, on the assumption that a mobile station is presently being provided with a service from base station BS1, and travels to a cell area CELL2 of the adjacent base station BS2.

The soft handoff is performed under the control of a base station controller (not shown) when the mobile station is situated in the overland area where the service area CELL1 of the BS1 and the service area CELL2 of the BS2 overlap each other. That is, the mobile station being presently provided with a service from the BS1 detects the power of a signal from BS2, and if the detected value is determined to be greater than a predetermined threshold value T_ADD, sends the detected value to a base station controller. The base station controller then determines whether BS2 is presently available to assign a channel between the BS2 and the mobile station. When a channel is assigned for BS2, BS1 and BS2 simultaneously provide a service to the mobile station through the respective assigned channels. In the meantime, as the mobile station continuously moves toward BS2 (i.e., from point a to point b), the mobile station eventually reaches a position where the signal power received from BS1 drops below a previously determined drop threshold T_drop for a handoff. Upon reaching a signal from BS1 at the drop threshold, the mobile station drops BS1, presently in service, and is provided with a service only from BS2. At this point, the mobile station does not drop BS1 immediately after the received signal power drops below the threshold T_drop, but only after delay of a guard time T_Tdrop. That is, when the signal power has dropped below the threshold T_drop, the mobile station drops BS1 after a lapse of the guard time T_Tdrop, so as to prevent a handoff from being erroneously performed due to an instantaneous drop of the signal power. However, in this case, the mobile station might erroneously select a farther base station rather than an adjacent base station as a handoff target base station.

This situation will be described in detail with reference to FIG. 3. When a mobile station MS5 moves from a cell serviced by base station BS1 towards a cell serviced by base station BS2, the mobile station MS5 determines a handoff target base station depending on pilot power. Preferably, the mobile station MS5 should determine that the closest base station BS2 as the handoff target base station, in a handoff area. However, in the case where the signal power from BS2 becomes lower due to bad surroundings such as a building, a signal from BS3 which is farther from MS5 than BS2 will transmit a higher power. In this case, MS5 performs a handoff to the far base station BS3 rather than the adjacent base station BS2. That is, when the signal power from the far base station BS3 becomes instantaneously higher than T_add due to surroundings, MS5 accepts BS3 in the activation set and performs a handoff add process. However, before long, the signal power from BS3 will become lower than the signal power from BS2, so that a handoff process will be performed again. Further, an abrupt drop of the signal power may completely disconnect a call.

The conventional handoff has the following problems:

(1) The mobile communication system will experience an increased load due to the unnecessary handoffs described above.

(2) When BS3 is added to the activation set, a communication channel is assigned to MS5, thereby wasting channel resources.

(3) Handoff is performed depending only on the pilot signal power from the base stations, causing handoff errors according to topography.

(4) The traveling direction of the mobile station is not considered for the handoff. Therefore, when the adjacent base station has a low signal power, the mobile station continues to maintain a traffic channel to the present service base station and fails to assign a traffic channel to the adjacent base station, thus causing a call disconnection.

SUMMARY OF THE INVENTION

It is, therefore, an object of the present invention to provide a device and method for performing a handoff taking into consideration a traveling direction of a mobile station in a mobile communication system.

It is another object of the present invention to provide a device and method for performing a handoff, in which a mobile station provides its present location and traveling direction to a base station during a handoff request.

It is a further object of the present invention to provide a device and method for performing a handoff depending on information about a location and a traveling direction, provided from a mobile station during a handoff request.

It is still another object of the present invention to provide a device and method for performing a handoff, which restrictively performs a handoff cancel upon receipt of a handoff cancel request from a mobile station.

To achieve the above objects, a device for performing a handoff in a mobile communication system includes a mobile station for transmitting a handoff request message including a measured signal power value and information about a traveling direction thereof, when signal power from an adjacent base station is determined to be higher than a predetermined threshold value; and a base station for performing a handoff depending on the measured signal power value and the traveling direction, upon receipt of the handoff request message.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
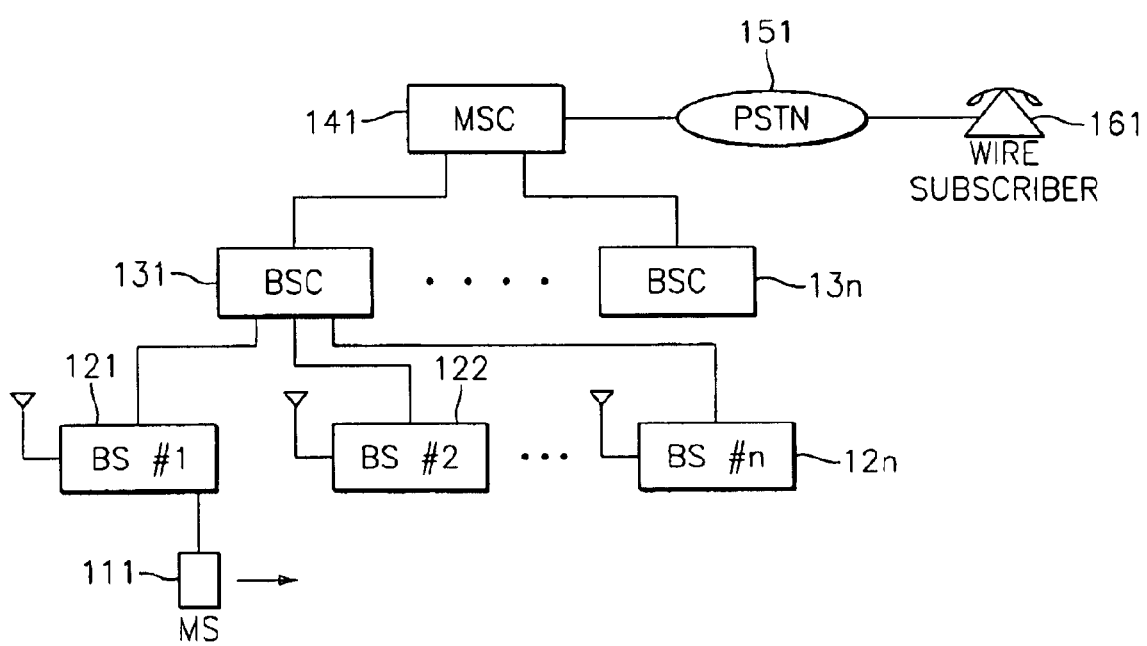
FIG. 1 is a system block diagram of a conventional mobile communication system.
Figure 2:
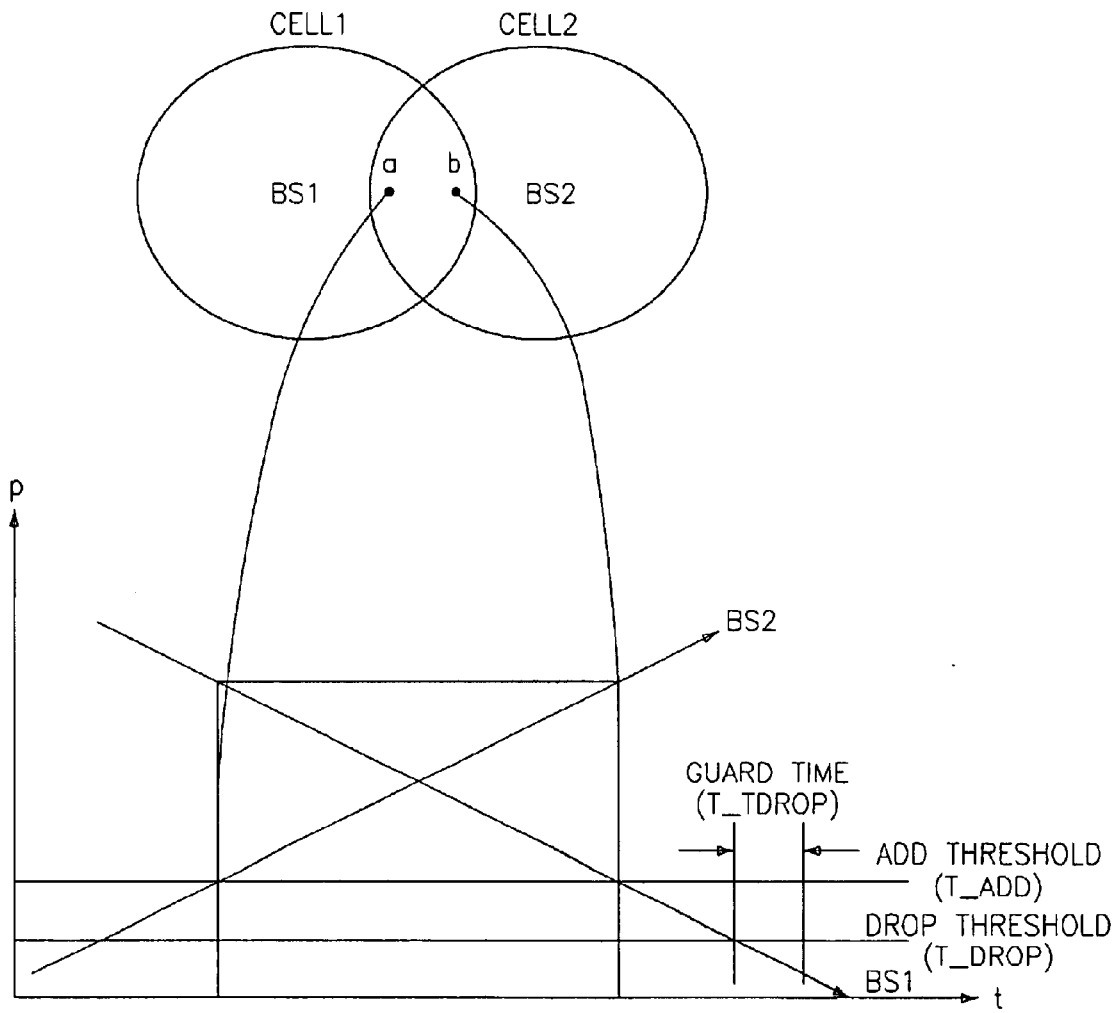
FIG. 2 is a diagram for explaining a conventional handoff procedure in the mobile communication system of FIG. 1.
Figure 3:
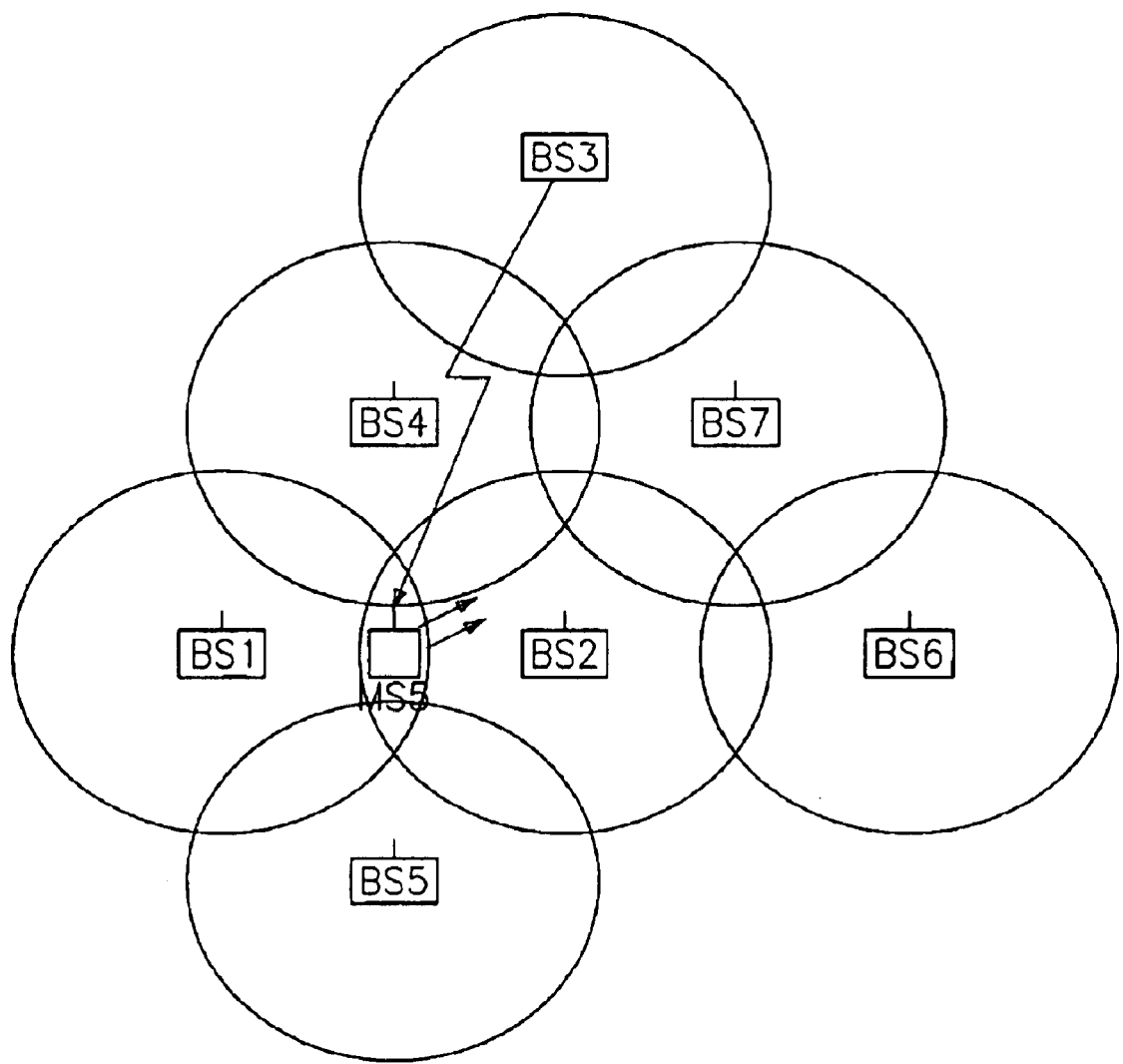
FIG. 3 is a diagram illustrating a situation where a mobile station selects an improper base station by performing handoff dependent only on pilot signal power.

A preferred embodiment of the present invention will be described hereinbelow with reference to the accompanying drawings. In the following description, well-known functions or constructions are not described in detail since they would obscure the invention in unnecessary detail.

Terms used herein are defined as follows. A "location flag" indicates whether a distance between a mobile station and an adjacent base station is relatively longer or shorter than a distance between the mobile station and a service base station. In the embodiment, the location flag is set to "1", when the distance between the mobile station and the adjacent base station is shorter than the distance between the mobile station and the service base station. Further, a "direction flag" indicates a direction towards which the base station the mobile station travel. In the embodiment, the direction flag is set to "1" when the mobile station travels to the adjacent base station, and to "0" when the mobile station travels to the service base station. Finally, a "displacement" represents a value obtained by subtracting a present detection index from a previous detection index. Here, the "detection index" refers to a search window index corresponding to a signal having the highest energy out of the signals detected after searching all the PN phases over a search window.

In the presently described embodiment, during a handoff, a mobile station uses the information defined above (i.e., location flag, direction flag and displacement) together with pilot power information, provided from a base station. This information is collectively used to perform a handoff depending not only on the present pilot power but also the location and traveling direction of the mobile station, to effectively assign the limited traffic resources and prevent handoff errors due to topographical obstacles.

In general, a mobile station uses a searcher in acquiring sync with a base station and repetitively measures the pilot signal power from an adjacent base station. In the present embodiment, the searcher is further used to estimate a location and a traveling direction of a mobile station. Estimation of the traveling direction is performed by detecting the variation in distance between a service base station detected by the searcher and a specific adjacent base station. Information about the traveling direction detected by the mobile station is provided to the service base station together with the pilot power information. The base station then controls a handoff procedure based on the received information.

In a mobile communication system, an important role of a searcher is to acquire PN codes generated from the base stations in a cell where the mobile stations are located, and search a PN code generated from an adjacent base station to perform a handoff. In the present embodiment, estimation of the location and traveling direction of the mobile station is obtained as a by-product of searching PN codes of adjacent base stations when performing a handoff.

Figure 4:
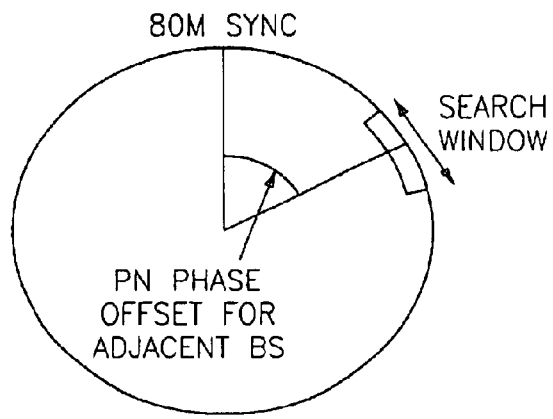
FIG. 4 is a diagram illustrating a method for determining a search duration for an adjacent base station based on a reference time of a mobile station.

FIG. 4 illustrates a phase for a PN period in a PN generator for distinguishing the base stations in the synchronous CDMA system. A searcher acquires sync with a service base station through acquisition of a PN code and thereafter, acquires system timing information through a sync channel message received from the base station. The mobile station aligns a mobile station time to system timing information contained within a 80 ms sync signal, so that the mobile station can determine where paging and traffic channel messages start. Such acquired sync becomes a reference time of the mobile station. Based on this acquired reference time, the mobile station then applies a mask corresponding to a pilot offset uniquely assigned to each respective base stations to a PN generator to search a pilot signal from a desired base station, during the search for a service base station and an adjacent base station. The mobile station can receive the PN offset of the adjacent base station from the service base station.

In the present embodiment, it is possible to detect a relative distance between a present service base station and a mobile station and adjacent base station and a mobile station using a pilot signal received from an adjacent base station. The pilot signal from the adjacent base station is viewed through a search window established while searching the adjacent base station. When the mobile station search the adjacent base station pilot signal, the search window center is a service base station signal arrival time obtained through searching the present service base station. If the distance between the adjacent base station and the mobile station becomes almost equal to the distance between the present service base station and the mobile station, an initial (or fastest) path of the adjacent base station will be acquired at the center of the search window that the mobile station has searched the adjacent base station. The initial path refers to a path which was first acquired. However, when the initial path is acquired after passage of the center of the search window, it means that the adjacent base station is farther from the mobile station than the service base station; otherwise, when the initial path is acquired before passage of the center of the search window, it means that the adjacent base station is closer to the mobile station than the service base station.

Figure 5:
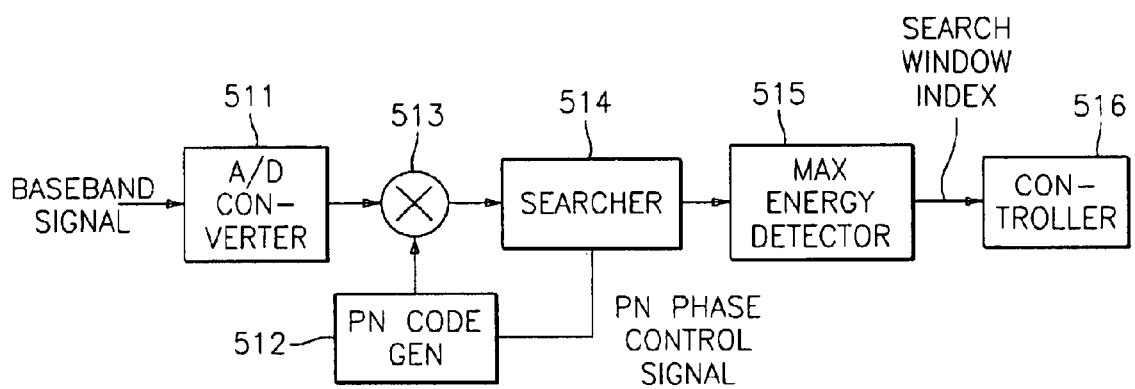
FIG. 5 is a block diagram illustrating a mobile station searching device according to an embodiment of the present invention.

A search procedure performed by the mobile station searcher will be described with reference to FIG. 5.

A signal received at an antenna of a mobile station is converted into a baseband signal through an RF/IF (Radio Frequency/Intermediate Frequency) stage and then applied to an analog-to-digital (A/D) converter 511. A PN code generator 512, under the control of a searcher 514, generates a PN code having a specific PN phase and provides it to a multiplier 513. A converted digital signal output from the A/D converter 511 is multiplied by the PN code at the multiplier 513 to be despread and then applied to the searcher 514. The searcher 514 accumulates an input signal for a predetermined time, converts the accumulated value to an energy value, and provides the energy value to a maximum energy detector 515.

In this manner, the searcher 514 calculates energy values for all the PN phases in a search window duration and provides the calculated energy values to the maximum energy detector 515. Here, the PN phase duration to be searched by the searcher 514 means a size of a search window having a window center, which is covered with a mask. The mask is equal to the size of the search window determined as a PN phase offset of a specific adjacent base station at a reference time synchronized with the service base station. The window center can be referred to as a search window index where it is expected that an initial path of the adjacent base station will be acquired at a reference time where the mobile station is synchronized with the service base station. In addition, the searcher 514 controls the PN code generator 512 after calculating an energy value for a specific PN phase, to enable the PN code generator 512 to generate a PN sequence corresponding to the next PN phase. FIG. 5 shows a PN phase control signal 121 for controlling the PN code generator 512.

The maximum energy detector 515 compares the provided energy values with a threshold and determines a first received energy value out of energy values exceeding the threshold. In addition, the maximum energy detector 515 provides a controller 516 with a search window index srch index[i] for a PN phase, used in measuring the determined energy value. The above stated threshold is a predetermined value and the search window index srch index[i] can be referred to as an index for designating the respective PN phases existing in the search window duration. The search window index srch_index[i] provided to the controller 516 becomes a detection index defined above.

The controller 516 compares the provided detection index with a previous detection index for a corresponding adjacent base station, to calculate a variation rate of the index. Further, the controller 516 determines whether the detection index is located at the left or right of the search window index srch_index[i] corresponding to the window center. As defined above, the window center is a search window index srch_index[i] corresponding to a PN phase, which is covered with a mask defining the window size which is equivalent to a PN phase offset of an adjacent base station at a reference time of the mobile station. The controller 516 calculates the location and traveling direction of the mobile station using the information (i.e., the variation rate, and the determination result as to whether the detection index is located at the left or right of the window center).

The calculated result is provided to a base station, to enable the base station to use the provided information in performing a handoff. The information that the mobile station provides to the base station is comprised of a location flag indicating whether a distance between the mobile station and the adjacent base station is longer or shorter than a distance between the mobile station and the service base station; a direction flag and a displacement, which indicates a variation of the distance between the mobile station and the base station, as the mobile station moves.

Figure 6:
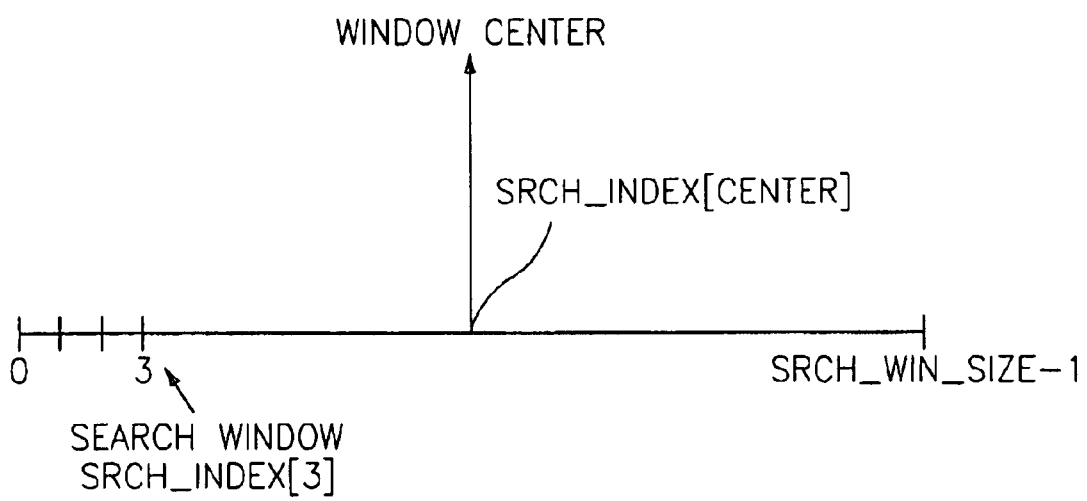
FIG. 6 is a diagram illustrating a search window including a PN phase to be searched.

FIG. 6 illustrates a detailed structure of a search window including a PN phase to be searched. As illustrated, unique search window indexes srch_index[i] are assigned to the respective PN phases in the search window duration, wherein a search window index srch_index[center] describes a PN phase offset for an adjacent base station assigned to the window center. A flag assigning method for the search window according to an embodiment of the present invention is as follows. A location flag is set to "0" when the fastest path determined according to the search of the adjacent base station is received at the left of the window center (i.e., srch_index[center]); otherwise, the location flag is set to "1".

Here, the path can be regarded as a search window index srch_index[i] corresponding to a given PN phase. A direction flag is set as a sign value according to a difference between the fastest path (srch_index[i-1]) detected in the previous search and the fastest path (srch_index[i]) detected in the present search. An error value (i.e., a moving margin) is required in setting the direction flag. That is, the moving margin is used to set the direction flag only when the distance that the mobile has moved for the searched period is longer than a predetermined distance. However, the moving margin is restrictively used for the distance that the mobile station has moved from the service base station to an adjacent base station.

Figure 7:
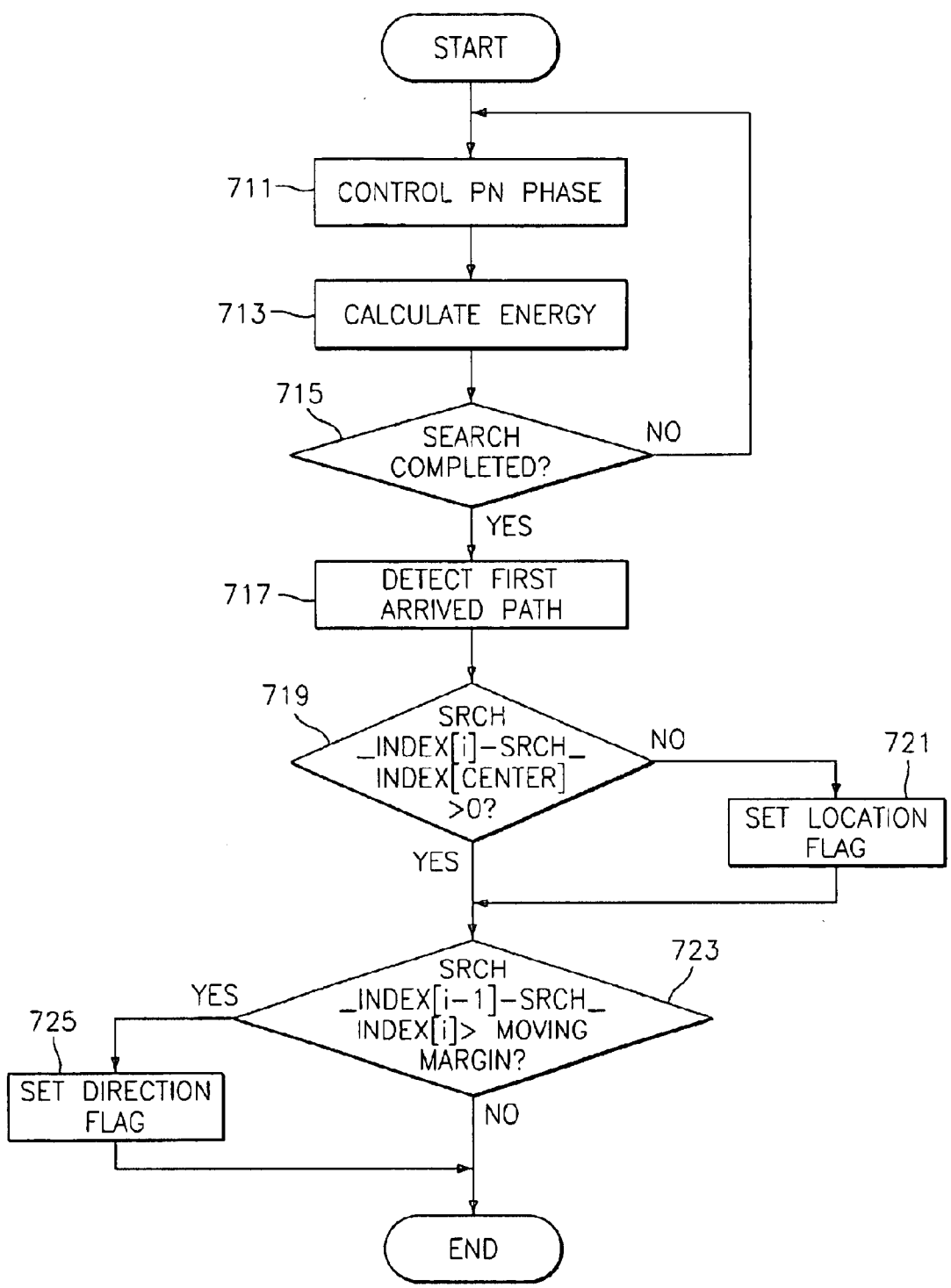
FIG. 7 is a flow chart illustrating a procedure for setting a location flag and a direction flag in a mobile station according to an embodiment of the present invention.

FIG. 7 illustrates a procedure for providing a flag setting result and a displacement together with pilot power to a base station from a mobile station, on the assumption that the mobile station has already acquired a reference time through synchronization with a service base station.

Referring to FIG. 7, a mobile station detects a received signal through a search window centered on a PN phase offset of an adjacent base station and service base station, in step 711. Here, the received signals correspond to a particular PN phase generated from the mobile station's PN code generator 512. Thereafter, the mobile station calculates an energy value for the detected received signal in step 713, and proceeds to step 715 to examine whether the search has been performed for all the PN phases constituting the search window. That is, the mobile station examines whether signal detection is complete for the last PN phase of the search window. When the search is performed for all the PN phases, the mobile station proceeds to step 717. Otherwise, when there remains some PN phases to be searched, the mobile station returns to step 711 to select the next PN phase. Upon returning to step 711, the mobile station selects those signals whose calculated energy values are higher than a threshold, out of all the calculated energy values and thereafter, selects an energy value corresponding to the first arrived path (i.e., the fastest path). That is, when the energy value is higher than the threshold, the mobile station detects a signal arrived at the leftmost of the search window. Upon detection of the first arrived path, the mobile station determines in step 719 whether the search window index (i.e., detection index) corresponding to the above path satisfies a condition of Equation (1).

$$\text{srch\_index}[i] - \text{srch\_index}[\text{center}] > 0 \qquad (\text{Eq. 1})$$

where srch_index[i] denotes a detection index and srch index[center] denotes an index for the search center. That is, Equation (1) is used to determine whether the detection index is greater than the index for the window center (hereinafter, referred to as a center index). When the detection index is smaller than the center index, Equation 1 is not satisfied and the mobile station proceeds to step 721 to set a location flag and then proceeds to step 723. Here, the location flag value is set to zero meaning that the mobile station is located closer to the service base station than the adjacent base station. Otherwise, if the detection index is greater than the center index, the procedure goes directly from step 719 to step 723.

The mobile station examines in step 723 whether a condition of Equation (2) is satisfied. That is, it is examined to which base station the mobile station moves.

$$\text{srch\_index}[i-1] - \text{srch\_index}[i] > \text{moving margin} \qquad (2)$$

where srch_index[i−1] denotes a detection index selected in the previous PN phase search process.

When Equation (2) is not satisfied, the mobile station ends the procedure according to the present invention. However, when Equation (2) is satisfied, the mobile station sets a direction flag and thereafter, ends the procedure. Here, the direction flag is set as a sign value depending on a difference between a detection index selected in the search process for the previous search window and a detection index selected in the search process for the present search window. The moving margin is used to only use those displacement values of the mobile station which are greater than a predetermined value.

For example, if it is assumed that a detection index (srch_index[i]) in the present search process is 5, a detection index (srch_index[i−1]) in the previous search process is 6, and a center index srch_index[center] is 8, the location flag and the direction flag will be set as follows. First, in accordance with Equation (1), 5−8<050, the detection index srch_index[i] is located at the left of the center index srch_index[center], and the location flag is set to "1". Setting the location flag to "1" means that the mobile station is located closer to the adjacent base station.

Second, with regard to the traveling direction, since the difference between srch_index[i−1] and srch_index[i] has a positive value (i.e., 6−5=1) in accordance with Equation (2), it is recognized that the mobile station is moving toward the adjacent base station. However, since the displacement is +1 which is lower than the moving margin of +2, the direction flag is not set.

That is, FIG. 7 illustrates a procedure in which the mobile station detects signals for the respective PN phases of a search window centered on a PN sequence offset of an adjacent base station and service base station, and estimates the relative location and traveling direction of the mobile station based on the detected signals. In the meantime, a setting method for the location flag and direction flag which are set in the above process, is a matter of application.

Table 1 shows a method for setting the location flag and the direction flag, by way of example.

TABLE 1

| Location Flag | Direction Flag | Comments |
| --- | --- | --- |
| 0 | 0(−) | MS is closer to adjacent BS rather than service BS, and is moving to service BS |
|  | 1(+) | MS is closer to adjacent BS rather than service BS, and is moving to adjacent BS |
| 1 | 0(−) | MS is closer to service BS rather than adjacent BS, and is moving to service BS |
|  | 1(+) | MS is closer to service BS rather than adjacent BS, and is moving to adjacent BS |

In Table 1, it is noted that the location flag and the direction flag are set to "1".

The location flag, direction flag and displacement information is provided to the service base station when the mobile station notifies the service base station of the pilot signal power received from the adjacent base station. Commonly, a mobile station continuously measures pilot signal power from the adjacent base station and sends a handoff request to the service base station to the service base station when the measured value is higher than a threshold. In this case, the conventional mobile station reports only the pilot signal power from the adjacent base station. However, in the present embodiment, the mobile station reports the pilot signal power together with the information (i.e., location flag, direction flag and displacement) set by the process of FIG. 7, so as to perform a handoff taking into consideration the traveling direction of the mobile station.

Figure 8:
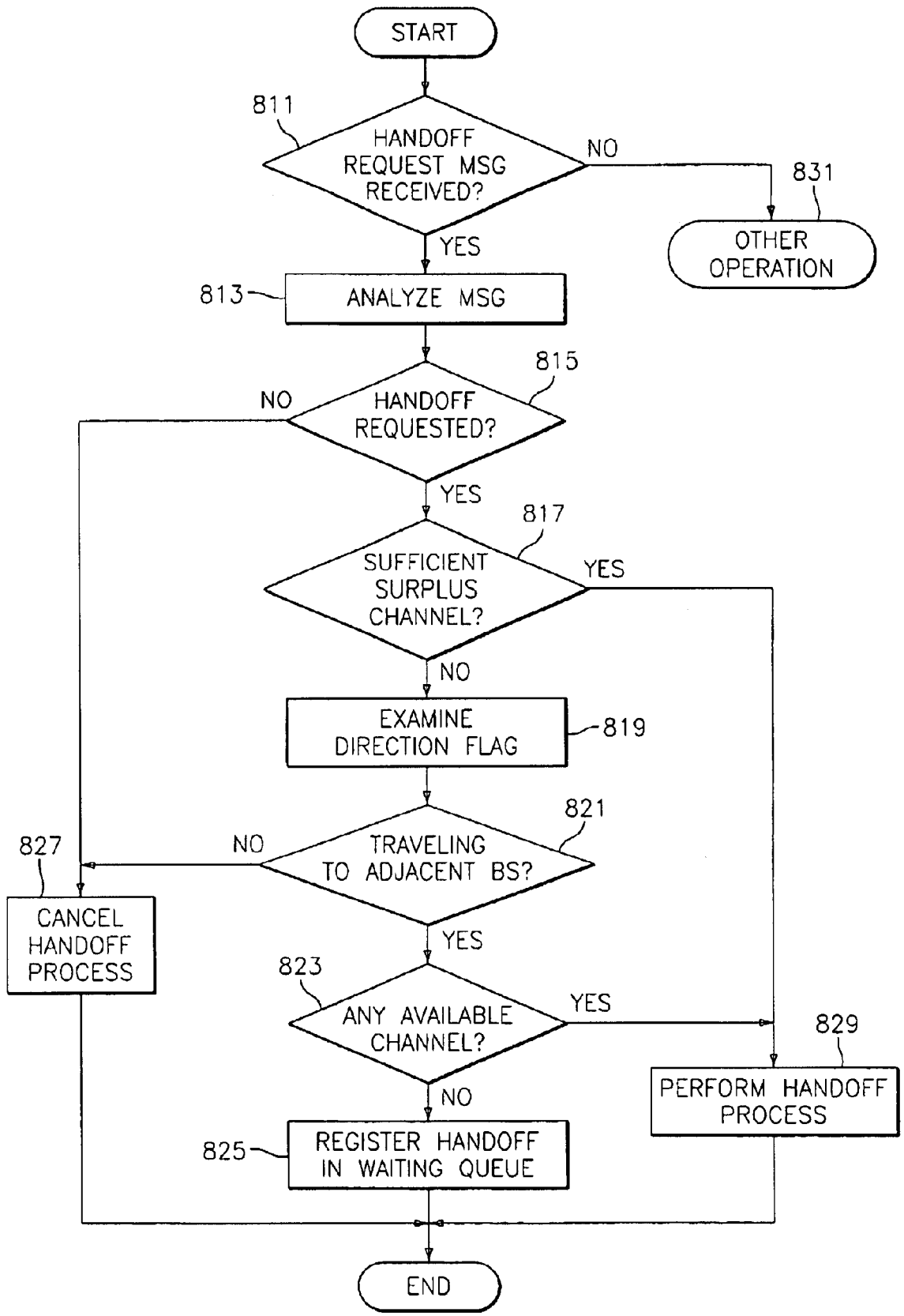
FIG. 8 is a flow chart illustrating a procedure for processing, at a base station, a handoff request received from a mobile station according to an embodiment of the present invention.

FIG. 8 illustrates a procedure for performing, at a base station, a handoff request received from a mobile station according to an embodiment of the present invention.

Referring to FIG. 8, the service base station examines in step 811 whether a handoff request message has been received from the mobile station. Upon receipt of the handoff request message, the service base station proceeds to step 813. Otherwise, upon failure to receive the handoff request message, the service base station proceeds to step 831 to perform another operation. Here, the handoff request is generated by the mobile station, when the pilot signal power received from the adjacent base station to the mobile station is higher than a handoff threshold T_ADD. Upon receipt of the handoff request message, the service base station analyzes the received handoff request message in step 813. The handoff request message includes the pilot signal power from the adjacent base station, location flag, direction flag and displacement.

Therefore, in step 815, the service base station examines whether a handoff is requested or not, depending on the pilot signal power from the adjacent base station and the location flag. If it is determined at the base station that a handoff is requested, the process continues to step 817. However, if it is determined at the base station that a handoff is not requested, the process continues to step 827 to cancel the handoff process.

Upon detection of the handoff request, the service base station examines, in step 817, traffic resources of the adjacent base station through a base station controller to determine whether there are sufficient spare channels. When it is determined that there are sufficient spare channels, the service base station proceeds to step 829 to perform a handoff. Otherwise, when it is determined that there are no sufficient spare channels, the service base station proceeds to step 819.

In step 819, the service base station examines the direction flag reported by the mobile station. Subsequently, in step 821, the service base station determines from the examined direction flag whether the mobile station is moving towards the adjacent base station. If it is determined that the mobile station is moving towards the adjacent base station, the service base station proceeds to step 823. Otherwise, when it is determined that the mobile station is not moving towards the adjacent base station, the service base station proceeds to step 827 to cancel the handoff and then ends the procedure. In step 823, the service base station examines again whether the adjacent base station has any available channels, through the base station controller, judging that it is urgent to assign a new channel to the mobile station. When there exists an available channel, the service base station performs a handoff in step 829. Otherwise, when there exists no available channel, the service base station proceeds to step 825 where priorities are assigned according to the location flag and the direction flag, and a handoff request is registered in a handoff waiting queue. Further, the service base station reports the handoff request registered in the handoff waiting queue to the base station controller and then ends the procedure according to the present invention. The base station controller also registers the handoff request in a handoff waiting queue, and reports the handoff request to the service base station to perform handoff call processing when the adjacent base station has a spare channel.

Table 2 shows a case where priorities are assigned according to the information provided to the service base station from the mobile station, by way of example.

TABLE 2

| Location Flag | Direction Flag | Comments | Priority |
|---|---|---|---|
| 0 | 0(−) | MS is closer to adjacent BS rather than service BS, and is moving to service BS | X |
|   | 1(+) | MS is closer to adjacent BS rather than service BS, and is moving to adjacent BS | 1 |
| 1 | 0(−) | MS is closer to service BS rather than adjacent BS; and is moving to service BS | X |
|   | 1(+) | MS is closer to service BS rather than adjacent BS, and is moving to adjacent BS | 2 |

It is noted from Table 2 that the highest priority is assigned to the case where the mobile station is closer to the adjacent base station and is moving to the adjacent base station, and the second highest priority is assigned to the case where the mobile station is closer to the service base station and is moving to the adjacent base station. X means it has low priority.

Another advantage of the present invention is in that it is possible to prevent maloperation due to topographical obstacles by examining the location flag and the direction flag even when the mobile station cancels a handoff request because of reduction in the pilot signal power during the adjacent base station search. This maloperation occurs in the case where the mobile station sends a handoff cancel request to the service base station because the signal power from the adjacent base station becomes lower due to a topographical obstacle, for the situation where the mobile station has requested a handoff while traveling to the adjacent base station. Even though the mobile station has requested deletion of the handoff call from the handoff waiting queue, if the mobile station is closer to the adjacent base station and is moving to the adjacent base station, the requested handoff call deletion is reserved. This handoff call deletion process will be disclosed in detail with reference to FIG. 9.

Figure 9:
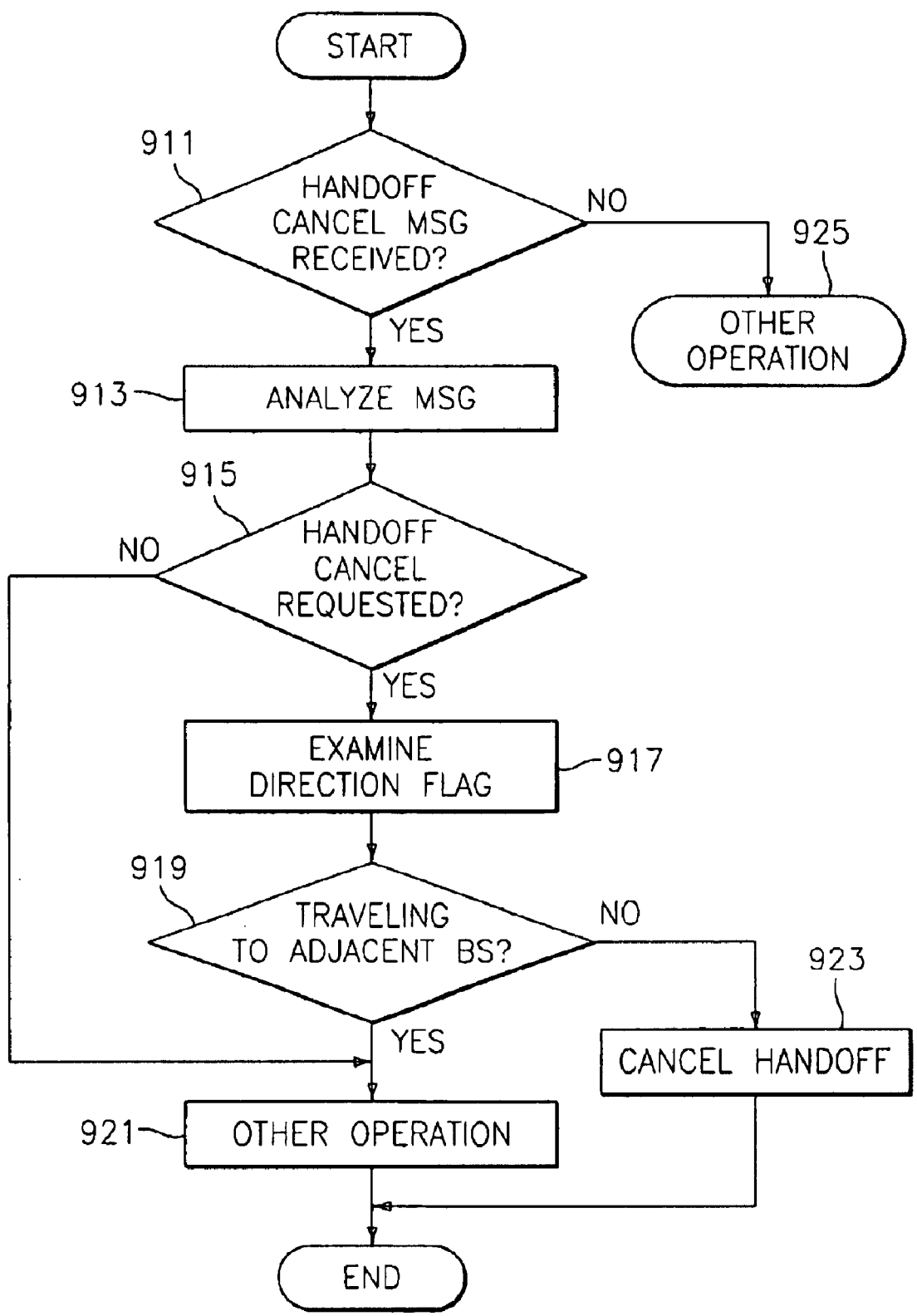
FIG. 9 is a flow chart illustrating a procedure for processing, at a base station, a handoff cancel message received from a mobile station according to an embodiment of the present invention.

Referring to FIG. 9, the service base station examines in step 911 whether a handoff cancel message has been received from the mobile station. The handoff message also includes pilot power from the adjacent base station, location flag, direction flag and displacement data. Upon failure to receive the handoff cancel message, the service base station proceeds to step 925 to perform another operation. Upon receipt of the handoff cancel message, the service base station analyzes the received handoff cancel message in step 913. Thereafter, in step 915, the service base station examines the pilot power from the adjacent base station to determine whether the handoff cancel is requested or not. When the handoff cancel is not requested, the service base station reserves the handoff cancel in step 912. However, when the handoff cancel is requested, the service base station examines the direction flag in step 917, and determines in step 919 whether the mobile station is moving toward the adjacent base station. That is, the service base station determines whether the direction flag is set to "1". When the direction flag is set to "0", the service base station cancels the handoff in step 923 and then ends the procedure. However, when the direction flag is set to "1", the service base station reserves cancellation of the handoff in step 921 and then ends the procedure.

As described above, the novel communication system performs a handoff taking into consideration the pilot power and the traveling direction of a mobile station, thereby securing an accurate handoff. That is, even though the pilot power may be instantaneously reduced due to a topographical obstacle situated at the service base station or the adjacent base station, a handoff is not immediately performed. In this case, whether to perform the handoff is determined by considering the traveling direction of the mobile station, thereby reducing the system load and preventing a waste of resources due to frequent handoffs.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A device for performing a handoff in a mobile communication system, including a mobile station, a service base station and a plurality of adjacent base stations, the device comprising:

a searcher for measuring power of received signals from the plurality of adjacent base stations, the received signals corresponding to respective PN phases within a range of a given search window;

a maximum energy detector for detecting out of the measured received signals those signals having a higher power than a threshold level, and determining a search window index corresponding to a first received signal out of the detected received signals; and a controller for generating location information and direction information of a mobile station according to the determined search window index, and making a handoff request message including the generated location information and direction information;

wherein the location information is generated according to a location of the determined search window index relative to a center index corresponding to a center of the search window.

2. The device as claimed in claim 1, wherein the search window is centered on the search window index, which is covered with a mask as much as a PN phase offset of the adjacent base station at a reference time synchronized with a service base station.

3. The device as claimed in claim 1, wherein the direction information is generated according to a difference between a previously determined search window index and a presently determined search window index.

4. The device as claimed in claim 3, wherein when the difference between the previously determined search window index and the presently determined search window index is greater than a moving margin, the direction information indicates that the mobile station is moving to the adjacent base station from the service base station.

5. The device as claimed in claim 1, wherein when the determined search window index precedes the center index, the location information indicates that the mobile station is located closer to the adjacent base station than the service base station, and when the determined search window index falls behind the center index, the location information indicates that the mobile station is located closer to the service base station than the adjacent base station.

6. A device for performing a handoff in a mobile communication system, comprising:

a mobile station for determining a search window index corresponding to a first received signal out of a plurality of signals received from an adjacent base station, the received signals being searched within a range of a given search window and having a higher power than a predetermined level, and generating location information and direction information of the mobile station according to the determined search window index to make a handoff request message; and a base station for receiving the handoff request message to analyze the location information and direction information, and performing a handoff according to the analyzed location information and direction information;

wherein the base station determines a location and a traveling direction of the mobile station according to the analyzed location information, and assigns a priority according to the location and the traveling direction of the mobile station.

7. The device as claimed in claim 6, wherein the base station assigns a highest priority when it is determined that the mobile station is located closer to the adjacent base station than the service base station and is moving to the adjacent base station from the service base station.

8. A method for performing a handoff in a mobile communication system, comprising the steps of:

determining a search window index corresponding to a first received signal out of a plurality of signals received from an adjacent base station, the received signals being measured within a range of a given search window and having a higher power than a predetermined level;

generating location information of the mobile station according to the determined search window index;

generating direction information of the mobile station according to the determined search window index and a previously determined search window index; and making a handoff request message including the generated location information and direction information, and providing the handoff request message to a base station;

wherein the location information is generated according to a location of the determined search window index relative to a center index corresponding to a center of the search window.

9. The method as claimed in claim 8, wherein the search window is centered on the search window index, which is covered with a mask as much as a PN phase offset of the adjacent base station at a reference time synchronized with a service base station.

10. The method as claimed in claim 8, wherein the direction information is generated according to a difference between a previously determined search window index and the presently determined search window index.

11. The method as claimed in claim 10, wherein when the difference between the previously determined search window index and the presently determined search window index is greater than a moving margin, the direction information indicates that the mobile station is moving to the adjacent base station from the service base station.

12. The method as claimed in claim 8, wherein when the determined search window index precedes the center index, the location information indicates that the mobile station is located closer to the adjacent base station than the service base station, and when the determined search window index is greater than the center index, the location information indicates that the mobile station is located closer to the service base station than the adjacent base station.

13. A method for performing a handoff in a mobile communication system, comprising the steps of:

receiving a handoff request message from a mobile station and determining whether an adjacent base station has sufficient spare channels;

analyzing, when the adjacent base station has insufficient spare channels, location information and direction information included in the handoff request message and performing a handoff according to the analyzed location information and direction information;

determining a location of the mobile station based on the analyzed location information;

determining a traveling direction of the mobile station based on the analyzed direction information; and assigning a priority according to the determined location and traveling direction of the mobile station and performing a handoff according to the priority.

14. The method as claimed in claim 13, wherein a highest priority is assigned when it is determined that the mobile station is located closer to the adjacent base station than the service base station and is moving to the adjacent base station from the service base station.

15. A method for performing a handoff in a mobile communication system, comprising the steps of:

determining a search window index corresponding to a first received signal out of a plurality of signals received from an adjacent base station, the received signals being searched within a range of a given search window and having a higher power than a predetermined level, and generating location information and direction information of the mobile station according to the determined search window index to make a handoff request message; and receiving the handoff request message to analyze location information and direction information, and performing a handoff according to the analyzed location information and direction information;

wherein the location information is generated according to a location of the determined search window index relative to a center index corresponding to a center of the search window.

16. The method as claimed in claim 15, further comprising the step of, upon receipt of a handoff cancel message, analyzing the location information and the direction information, and determining cancellation of a handoff based on the analyzed location information and direction information.

17. The method as claimed in claim 15, wherein the search window is centered on the search window index, which is covered with a mask as much as a PN phase offset of the adjacent base station at a reference time synchronized with a service base station.

18. The method as claimed in claim 15, wherein the direction information is generated according to a difference between a previously determined search window index and the presently determined search window index.

19. The method as claimed in claim 18, wherein when the difference between the previously determined search window index and the presently determined search window index is greater than a moving margin, the direction information indicates that the mobile station is moving to the adjacent base station from the service base station.

20. The method as claimed in claim 15, wherein when the determined search window index precedes the center index, the location information indicates that the mobile station is located closer to the adjacent base station than the service base station, and wherein when the determined search window index is greater than the center index, the location information indicates that the mobile station is located closer to the service base station rather than the adjacent base station.

21. The method as claimed in claim 15, wherein the handoff performing step comprises the steps of:

determining a location of the mobile station based on the analyzed location information;

determining a traveling direction of the mobile station based on the analyzed direction information; and assigning a priority according to the determined location and traveling direction of the mobile station and performing a handoff according to the priority.

22. The method as claimed in claim 21, wherein a highest priority is assigned when it is determined that the mobile station is located closer to the adjacent base station than the service base station and is moving to the adjacent base station from the service base station.

* * * * *